United States Patent
Murad et al.

(10) Patent No.: US 10,268,907 B2
(45) Date of Patent: Apr. 23, 2019

(54) METHODS AND SYSTEMS FOR PROVIDING NOTIFICATIONS ON CAMERA DISPLAYS FOR VEHICLES

(71) Applicant: GM GLOBAL TECHNOLOGY OPERATIONS LLC, Detroit, MI (US)

(72) Inventors: Mohannad Murad, Troy, MI (US); Joseph Machak, Oakland Township, MI (US); Michael A. Wuergler, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 159 days.

(21) Appl. No.: 15/403,810

(22) Filed: Jan. 11, 2017

(65) Prior Publication Data

US 2018/0197023 A1    Jul. 12, 2018

(51) Int. Cl.
| | |
|---|---|
| H04N 9/45 | (2006.01) |
| G06K 9/00 | (2006.01) |
| H04N 7/18 | (2006.01) |
| H04N 5/232 | (2006.01) |
| H04N 5/272 | (2006.01) |
| B60R 1/00 | (2006.01) |
| H04N 5/77 | (2006.01) |
| H04N 5/265 | (2006.01) |
| H04N 9/04 | (2006.01) |
| G06T 11/60 | (2006.01) |

(52) U.S. Cl.
CPC ............ *G06K 9/00805* (2013.01); *B60R 1/00* (2013.01); *G06T 11/60* (2013.01); *H04N 5/232* (2013.01); *H04N 5/23293* (2013.01); *H04N 5/265* (2013.01); *H04N 5/272* (2013.01); *H04N 5/77* (2013.01); *H04N 7/183* (2013.01); *H04N 9/045* (2013.01); *B60R 2300/207* (2013.01); *B60R 2300/30* (2013.01); *B60Y 2400/92* (2013.01); *G06K 9/00362* (2013.01)

(58) Field of Classification Search
CPC ...... B60R 1/00; H04N 7/183; H04N 5/23293; H04N 5/272; H04N 5/907; H04N 9/04; G06K 9/4604; G06K 9/00805; G06T 7/90; G06T 7/20
See application file for complete search history.

(56) References Cited

U.S. PATENT DOCUMENTS

| | | | |
|---|---|---|---|
| 7,942,313 B1* | 5/2011 | Grimm | G06Q 20/042 235/375 |
| 9,317,742 B2* | 4/2016 | Kramer | B60K 35/00 |
| 2002/0003571 A1* | 1/2002 | Schofield | B60C 23/00 348/148 |
| 2002/0110262 A1* | 8/2002 | Iida | B60R 1/00 382/104 |

(Continued)

*Primary Examiner* — Neil R Mikeska
(74) *Attorney, Agent, or Firm* — Lorenz & Kopf LLP

(57) ABSTRACT

Methods and systems are provided for providing notifications on camera displays for vehicles. In accordance with one embodiment, camera is mounted on a body of the vehicle, and is configured to generate camera images. A processor is configured to at least facilitate generating a display image based on a processing of the camera images, for display on a display screen within the vehicle; determining a fixed region of the display image corresponding to a fixed part of the vehicle; and providing notifications on the display image in the fixed region of the display image.

20 Claims, 6 Drawing Sheets

(56) References Cited

U.S. PATENT DOCUMENTS

| | | | |
|---|---|---|---|
| 2003/0117728 A1* | 6/2003 | Hutzel | B60R 1/008 359/838 |
| 2004/0260469 A1* | 12/2004 | Mizusawa | B60R 1/00 701/300 |
| 2012/0140080 A1* | 6/2012 | Taylor | B60C 23/0408 348/148 |
| 2013/0222593 A1* | 8/2013 | Byrne | B60R 1/00 348/148 |
| 2014/0285666 A1* | 9/2014 | O'Connell | B60R 1/00 348/148 |
| 2015/0022665 A1* | 1/2015 | Lu | B60R 1/00 348/148 |
| 2015/0296135 A1* | 10/2015 | Wacquant | G06F 3/013 348/207.11 |
| 2015/0302737 A1* | 10/2015 | Geerlings | G08C 17/02 340/5.25 |
| 2015/0307024 A1* | 10/2015 | Fukuda | B60Q 9/008 382/103 |
| 2016/0171720 A1* | 6/2016 | Todeschini | G06T 11/001 345/592 |
| 2016/0189547 A1* | 6/2016 | Hsu | G08G 1/166 701/70 |
| 2016/0325680 A1* | 11/2016 | Curtis | B60R 1/00 |

\* cited by examiner

US 10,268,907 B2

METHODS AND SYSTEMS FOR PROVIDING NOTIFICATIONS ON CAMERA DISPLAYS FOR VEHICLES

TECHNICAL FIELD

The technical field generally relates to the field of vehicles and, more specifically, to methods and systems for providing notifications on camera displays for vehicles.

BACKGROUND

Many vehicles include a camera that collects images for a region outside the vehicle (e.g. a rear view camera that collects images for a region behind the vehicle) that are displayed within a vehicle. Many vehicles also provide notifications on displays, for example pertaining to nearby vehicles or obstacles. However, providing such notifications on such displays can potentially clutter the displays or block objects in the displays under certain circumstances.

Accordingly, it is desirable to provide improved methods and systems for providing notifications on camera displays for vehicles. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided. The method includes the steps of obtaining camera images for a camera that is mounted on a vehicle, each of the camera images including a plurality of pixels; generating, via a processor, a display image based on a processing of the camera images for display on a display screen within the vehicle; determining a fixed region of the display image corresponding to a fixed part of the vehicle; and providing notifications on the display image in the fixed region of the display image.

In accordance with another exemplary embodiment, a system is provided. The system includes a communication link and a processor. The communication link is configured to provide camera images for a camera that is mounted on a vehicle. The processor configured to at least facilitate generating a display image based on a processing of the camera images, for display on a display screen within the vehicle; determining a fixed region of the display image corresponding to a fixed part of the vehicle; and providing notifications on the display image in the fixed region of the display image.

In accordance with a further exemplary embodiment, a vehicle is provided. The vehicle includes a body, a camera, and a processor. The camera is mounted on the body, and is configured to generate camera images. The processor is configured to at least facilitate generating a display image based on a processing of the camera images, for display on a display screen within the vehicle; determining a fixed region of the display image corresponding to a fixed part of the vehicle; and providing notifications on the display image in the fixed region of the display image.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
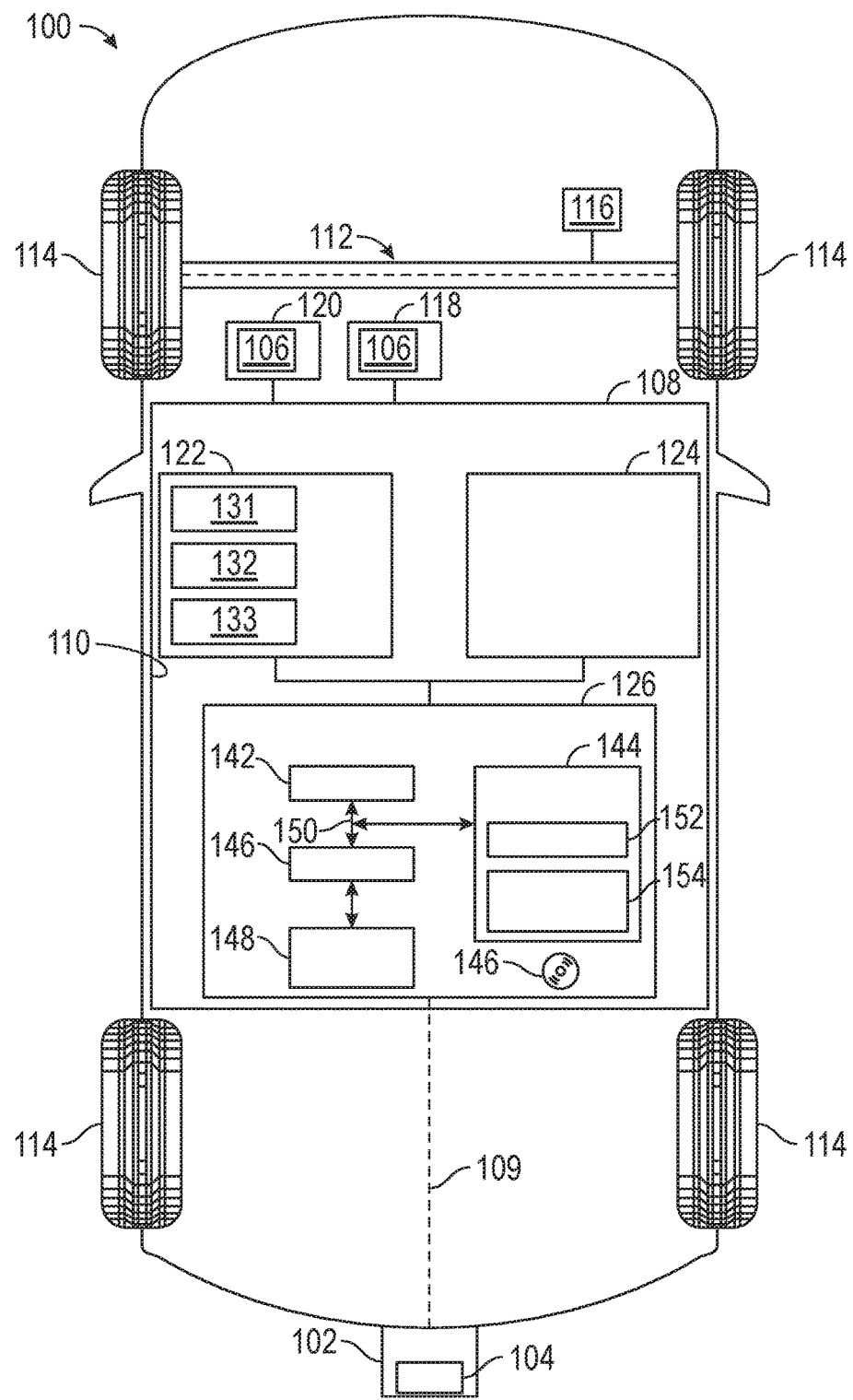
FIG. 1 is a functional block diagram of a vehicle that includes a camera, a control system for controlling the camera, and one or more displays for displaying images from the camera, in accordance with an exemplary embodiment.

FIG. 1 illustrates a vehicle 100, according to an exemplary embodiment. As described in greater detail further below, the vehicle 100 includes a camera 102 that is mounted on a body 110 of the vehicle 100 and provides images. The camera 102 is controlled via a control system 108, as depicted in FIG. 1. In various embodiments, the control system 108 provides a notification along with processed images provided by the camera 102, in which the notification is provided as part of a fixed region of a display image generated from the processed images, for example as discussed further below in connection with FIG. 1 as well as FIGS. 2-6.

The vehicle 100 preferably comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, or other system having a camera image with a fixed referenced point.

The vehicle 100 includes the above-referenced body 110 that is arranged on a chassis 112. The body 110 substantially encloses other components of the vehicle 100. The body 110 and the chassis 112 may jointly form a frame. The vehicle 100 also includes a plurality of wheels 114. The wheels 114 are each rotationally coupled to the chassis 112 near a respective corner of the body 110 to facilitate movement of the vehicle 100. In one embodiment, the vehicle 100 includes four wheels 114, although this may vary in other embodiments (for example for trucks and certain other vehicles).

A drive system 116 is mounted on the chassis 112, and drives the wheels 114. The drive system 116 preferably comprises a propulsion system. In certain exemplary embodiments, the drive system 116 comprises an internal combustion engine and/or an electric motor/generator, coupled with a transmission thereof. In certain embodiments, the drive system 116 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, the camera 102 is mounted on the body 110 of the vehicle 100. In the depicted embodiment, the camera 102 is mounted on a rear end of the vehicle, as shown in FIG. 1. It will be appreciated that this may vary in certain embodiments. For example, while in the depicted embodiment, the camera 102 is a rear-facing camera disposed on or proximate a rear portion of the vehicle 100, in other embodiments, the camera 102 may be mounted on a passenger's side, driver's side, or elsewhere on the body 110 of the vehicle 100 (e.g. on top of the vehicle 100, in front of the vehicle 100, on a windshield or grille of the vehicle 100, and so on).

The camera 102 provides images for viewing on one or more displays 106 that are disposed inside the vehicle 100 (i.e. inside the body 110 of the vehicle 100). As depicted in FIG. 1 and noted above, the camera 102 includes a lens 104 that captures images for the camera 102.

In one embodiment, the camera 102 provides images for viewing on a display 106 of a rear view mirror 118 of the vehicle 100. Also as depicted in FIG. 1, in one embodiment the camera 102 provides images for viewing on a display 106 of a navigation system 120 of the vehicle 100. In various embodiments, the display 106 may be provided on both the rear view mirror 118 and the navigation system 120, and/or on one or more other non-depicted displays 106 within the vehicle 100 (e.g., in a front instrument panel of the vehicle 100, in one or more side mirrors of the vehicle 100, or the like). In various embodiments, each display 106 comprises a video screen that is coupled to the camera 102. In one exemplary embodiment the display 106 comprises a liquid crystal display (LCD) screen or a light emitting diode (LED) screen. However, this may vary in other embodiments.

The control system 108 controls operation of the camera 102 and the displays 106. The control system 108 is disposed within the body 110 of the vehicle 100. In one embodiment, the control system 108 is mounted on the chassis 112. Among other control features, the control system 108 obtains images from the camera 102, processes the images, and displays the processed images as part of a display image on one or more of the displays 106 of the vehicle 100, along with a notification on a fixed portion of the display image. In various embodiments, the control system 108 provides these and other functions in accordance with steps of the process 200 described further below in connection with FIGS. 2-6. In certain embodiments, the control system 108 may be disposed outside the body 110, for example on a remote serve, in the cloud, or in a remote smart phone or other device where image processing is performed remotely.

Also as depicted in FIG. 1, in various embodiments the control system 108 is coupled to the camera 102 via a communication link 109, and receives camera images from the camera 102 via the communication link 109. In certain embodiments, the communication link 109 comprises one or more wired connections, such as one or more cables (e.g. coaxial cables and/or one or more other types of cables), and/or one or more wireless connections (e.g. using wireless bus technology).

As depicted in FIG. 1, the control system 108 includes a sensor array 122 and a controller 126. Also as depicted in FIG. 1, in certain embodiments the control system 108 also includes a transceiver 124. In certain embodiments, the images from the camera 102 may be received by the control system 108 via one or more transceivers 124 and/or components thereof (e.g. a receiver).

The sensor array 122 includes one or more sensors that provide object detection for the vehicle 100. Specifically, in various embodiments, the sensor array 122 includes one or more radar sensors 131, lidar sensors 132, sonar sensors 133, one or more of the cameras 102, and/or other object detection sensors that allow the control system 108 to identify and track the position and movement of moving vehicles, other vehicles, and other objects in proximity to the vehicle 100. In certain embodiments, the sensors of the sensor array 122 are disposed at or near the rear of the vehicle 100, and/or at or near the driver side and/or passenger side of the vehicle 100, for example in order to detect and track other vehicles and objects that the vehicle 100 may encounter when backing up (e.g. into a parking spot), among other possible variations. In addition, in certain embodiments, the sensor array 122 may also include certain additional sensor(s) that may provide vehicle speed (e.g. to determine whether or not the vehicle 100 is moving, and the trajectory and direction of movement), along with for example using one or more wheel speed sensors or accelerometers, among other possible sensors and/or related devices and/or systems.

The controller 126 processes and analyzes the images provided from the camera 102 via the communication link 109 (and, in some embodiments, from the transceiver 124) as well as data provided by the sensors of the sensor array 122. The controller determines information regarding vehicles and other objects in proximity to the vehicle 100, determines a fixed portion of a display image associated with the camera images, and provides appropriate notifications pertaining to the detected vehicles and other objects on the fixed portion of the display image. Also in various embodiments, the controller 126 controls other aspects of the display of images associated with the camera 102 on the one or more displays 106 of the vehicle 100 (e.g. by processing and cropping the images, and so on). In various embodiments, the controller 126 provides these and other functions in accordance with the steps discussed further below in connection with the schematic drawings of the vehicle 100 in FIG. 1 and the flowchart of FIG. 2 and associated illustration of display images of FIGS. 3-6 in connection with the process 200 of FIG. 2).

In one embodiment, the controller 126 is coupled to the camera 102, the displays 106, the sensor array 122, and the transceiver 124. Also in one embodiment, the controller 126 is disposed within the control system 108, within the vehicle 100. In certain embodiments, the controller 126 (and/or components thereof, such as the processor 142 and/or other components) may be part of the camera 102, disposed within the camera 102, and/or disposed proximate the camera 102. Also in certain embodiments, the controller 126 may be disposed in one or more other locations of the vehicle 100. In addition, in certain embodiments, multiple controllers 126 may be utilized (e.g. one controller 126 within the vehicle 100 and another controller within the camera 102), among other possible variations. In addition, in certain embodiments, the controller can be placed outside vehicle, such as in a remote server, in the cloud or on a remote smart device.

As depicted in FIG. 1, the controller 126 comprises a computer system. In certain embodiments, the controller 126 may also include one or more of the sensors of the sensor array 122, the transceiver 124 and/or components thereof, the camera 102 and/or components thereof, one or more displays 106 and/or components thereof, and/or one or more other devices and/or systems and/or components thereof. In addition, it will be appreciated that the controller 126 may otherwise differ from the embodiment depicted in FIG. 1. For example, the controller 126 may be coupled to or may otherwise utilize one or more remote computer systems and/or other control systems, for example as part of one or more of the above-identified vehicle 100 devices and systems.

In the depicted embodiment, the computer system of the controller 126 includes a processor 142, a memory 144, an interface 146, a storage device 148, and a bus 150. The processor 142 performs the computation and control functions of the controller 126, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 126 and the computer system of the controller 126, generally in executing the processes described herein, such as the process 200 described further below in connection with FIGS. 2-6.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more stored values 154.

The bus 150 serves to transmit programs, data, status and other information or signals between the various components of the computer system of the controller 126. The interface 146 allows communication to the computer system of the controller 126, for example from a system driver and/or another computer system, and can be implemented using any suitable method and apparatus. In one embodiment, the interface 146 obtains the various data from the sensors of the sensor array 122 and/or the transceiver 124. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including direct access storage devices such as hard disk drives, flash systems, floppy disk drives and optical disk drives. In one exemplary embodiment, the storage device 148 comprises a program product from which memory 144 can receive a program 152 that executes one or more embodiments of one or more processes of the present disclosure, such as the steps of the process 200 (and any sub-processes thereof) described further below in connection with FIGS. 2-6. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 126 may also otherwise differ from the embodiment depicted in FIG. 1, for example in that the computer system of the controller 126 may be coupled to or may otherwise utilize one or more remote computer systems and/or other control systems.

Figure 2:
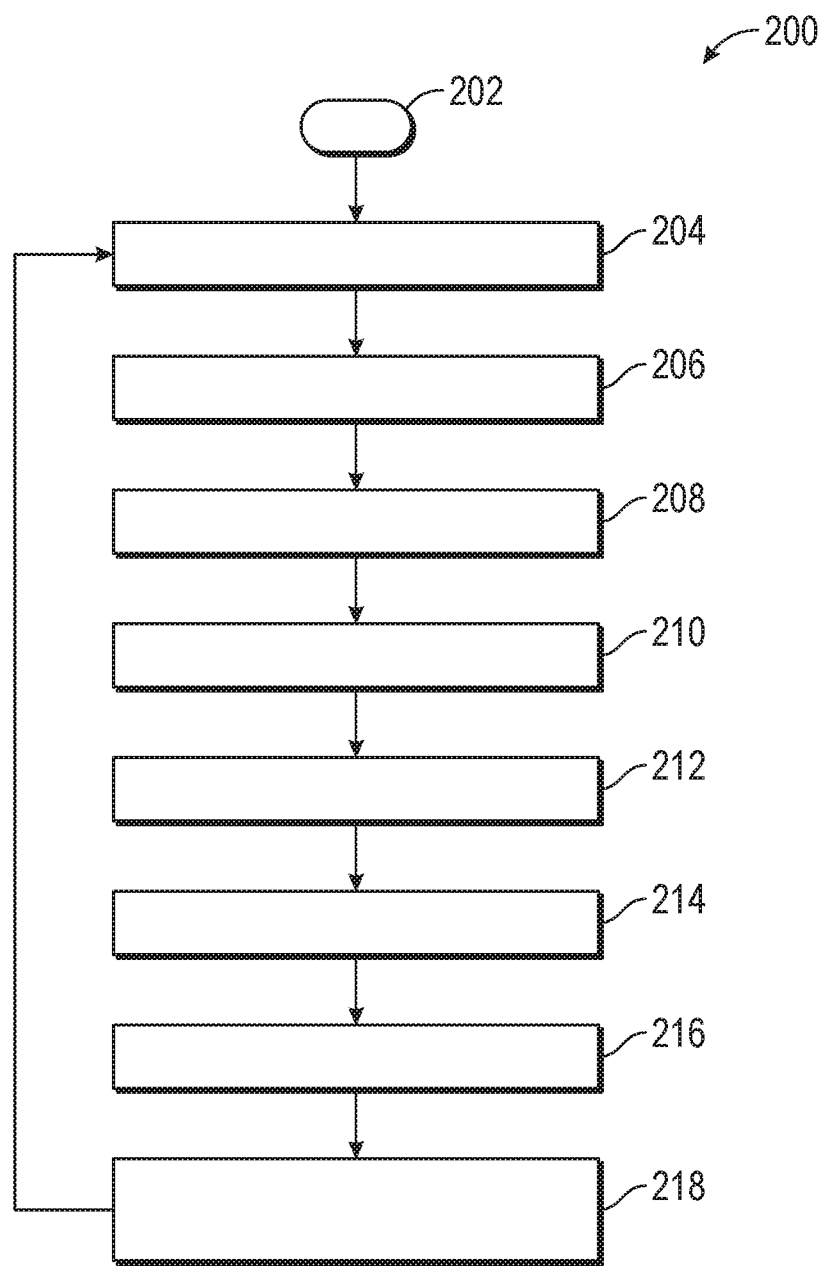
FIG. 2 is a flowchart of a process for providing notifications on a camera display for a vehicle, and that can be implemented in connection with the vehicle, camera, control system, and display of FIG. 1, in accordance with an exemplary embodiment.

FIG. 2 is a flowchart of a process 200 for providing notifications on a fixed portion of a display image of camera images for a vehicle, in accordance with an exemplary embodiment. The process 200 of FIG. 2 can be implemented in connection with the vehicle 100, camera 102, control system 108, and displays 106 of FIG. 1, in accordance with an exemplary embodiment. The process 200 is also discussed below in connection with FIGS. 3-6, with depicts exemplary display images 300-600 of one of the displays 106 of the vehicle 100.

As depicted in FIG. 2, the process begins at 202. In one embodiment, the process 200 begins when a vehicle drive or ignition cycle begins, for example when a driver approaches or enters the vehicle, or when the driver turns on the vehicle and/or an ignition therefor (e.g. by turning a key, engaging a keyfob or start button, and so on). In another embodiment, the process 200 begins when the camera 102 is activated (e.g., when the vehicle 100 is in a reverse gear triggering use of a rear camera, and so on). In one embodiment, the steps of the process 200 are performed continuously during operation of the vehicle.

Camera images are obtained (step 204). Specifically, camera images are obtained for the camera 102 of FIG. 1. The images are transmitted and received (step 206). In one embodiment, the images are transmitted by the camera 102 of FIG. 1 along the communication link 109 of FIG. 1 to the control system 108 (e.g. the controller 126, including the processor 142) of FIG. 1. In certain other embodiments, the images are provided to the control system 108 via one or more transceivers, such as the transceiver 124 of FIG. 1.

The images are processed (step 206). In various embodiments, the camera images of steps 204 and 206 are processed during step 206 in order to crop, adjust, and/or re-size the images for display in accordance with the dimensions of one or more of the displays of FIG. 1. In various embodiments, the processing of the camera images is performed via the processor 142 of FIG. 1.

A display image is generated (step 208). In various embodiments, the processed images of step 208 are formed into a display image in step 208 in a format that will be viewed on one or more of the displays 106 inside the vehicle 100. In various embodiments, the display image is generated by the processor 142 of FIG. 1.

A fixed region of the display image is determined (step 210). In various embodiments, the fixed region is determined by the processor 142 of FIG. 1.

In one embodiment, as part of step 210 the fixed region corresponds to a bumper of the vehicle 100. Specifically, in one embodiment, the fixed region of the display image corresponds to a portion or region of the fixed region on which the bumper of the vehicle is visible. In one such embodiment, a known location of the bumper is stored in a memory (e.g. as one of the stored values 154 of the memory 144 of FIG. 1), for example when the vehicle 100 is manufactured and serviced, and is retrieved from the memory 144 by the processor 144 as part of step 210. In another embodiment, one or more sensors of the sensor array 122 are utilized to detect the bumper as part of step 210. In yet other embodiments, one or more other stationary parts of the vehicle 100 (e.g. a pillar, trunk, door, or antenna) may be associated with the fixed region.

In yet other embodiments, as part of step 210 the determination of the fixed region is performed by analyzing movement (or lack of movement) of pixels in the images. For example, in one embodiment, pixels of the processed images of step 206 and/or the display image of step 208 are analyzed over time. In one embodiment, the pixels of each frame of the camera images are analyzed in sequence with respect to color and brightness by the processor with respect to whether corresponding images between the different picture frames include changes in the corresponding pixels (e.g. as to color and/or brightness). Also in one embodiment, the fixed region is determined by the processor 142 of FIG. 1 as a region of the display image 208 for which the pixels have been determined to not be changing (or for which any pixel rate of change is determined to be less than a predetermined threshold). In various examples of this embodiment, a "change" in a pixel refers to a change in color or brightness of the pixel, and a "rate of change" in a pixel refers to a rate of change in the pixel's color or brightness. In one embodiment, the non-changing region is identified based on the analysis of pixels among sequential frames of the processed camera images. Also in certain embodiments, the predetermined thresholds may be different for the rate of change in color versus the rate of change in brightness.

One or more objects are detected (step 212). In various embodiments, one or more moving vehicles, stationary vehicles, other moving objects, and/or other stationary objects (e.g. bicycles, pedestrians, rocks, trees, structures, and so on) are detected via data provided by one or more sensors of the sensor array 122 of FIG. 1 (e.g. by one or more radar sensors 131, lidar sensors 132, sonar sensors 133, and/or other object detection sensors of the sensor array 122 of FIG. 1). Also in certain embodiments, the objects may also be detected via the camera 102 of FIG. 1 and/or via one or more other cameras (e.g. as part of the sensor array 122). Also in certain embodiments, data pertaining to the detected objects is provided to the processor 142 of FIG. 1 for analysis.

The detected objects are tracked (step 214). In various embodiments, the detected objects of step 210 are tracked, for example with respect to whether particular objects are moving and, if so, the characteristics of the movement (e.g. with respect to direction of movement, speed and velocity of movement, acceleration, and so on). In various embodiments, the tracking is performed using multiple sensor data points over time using the data provided by the sensors of the sensor array 122 in conjunction with corresponding analysis and determinations (e.g. as to movement of the objects and relative movement with respect to the vehicle 100) performed by the processor 142 of FIG. 1.

One or more notifications are prepared (step 216). Specifically, the notifications are prepared for display in, or as part of, the fixed region 210 of the display image of step 208. In various embodiments, the display notifications are prepared by the processor 142 of FIG. 1 for display on one or more displays 106 (e.g. display screens) of the vehicle 100.

In various embodiments, notifications are prepared in step 216 to inform a driver and/or passengers of the vehicle 100 with respect to the objects in proximity to the vehicle 100 that have been detected in step 212 and tracked in step 214. In various embodiments, the notifications include information as to the detected object(s). In certain embodiments, the notifications also include information as to one or more positions and/or directions of movement of the detected objects, and/or a classification of the type of object (e.g. another vehicle, a pedestrian, an animal, and so on). In certain embodiments, the notifications may also pertain to other information, in addition to detected objects (e.g., other information pertaining to the vehicle, the roadway, surrounding environments, and/or other types of information).

For example, in certain embodiments, a color coding may be utilized as part of the notifications of step 216 to illustrate the position of the detected object. For example, in one embodiment, objects that are within a certain predetermined distance (or time, considering movement of the object and/or the vehicle 100) threshold result in the fixed region being colored a first color (e.g. red) as being particularly close to the vehicle, while objects that are within a certain larger threshold distance or time (i.e. somewhat farther from the vehicle) may result in the fixed region being colored with a second color (e.g. yellow). In one embodiment, the first color (e.g., red) is used if the object is less than one meter from the vehicle, and the second color (e.g. yellow) is used if the object is between one meters and five meters from the vehicle; however, this may vary in other embodiments. Also in one embodiment, if no objects are detected, then a third color (e.g. green) may be utilized.

Also in certain embodiments, one or more symbols may be utilized to indicate the type of the object that has been detected. For example, in certain embodiments, a triangle, or an image of a person, or an image of a person within a triangle, may be used to indicate that a pedestrian has been detected in proximity to the vehicle. Also in certain embodiments, the notification may be flashing, or may be flashing under certain circumstances (e.g. if the detected object is a pedestrian, and/or if the detected is within a predetermined distance or time from the vehicle 100).

In addition, in certain embodiments, an arrow may be utilized to indicate the direction of movement of the detected objet(s). For example, in one embodiment, a right facing arrow may indicate that objects are approaching the vehicle 100 from the left heading to the right, while a left arrow may indicate that objects are approaching the vehicle 100 from the right heading to the left, and so on. In certain embodiments, a flashing arrow may be provided. In various other embodiments, other types of symbols may be utilized (e.g. icons representing animals, and so on).

In addition, the images and notifications are displayed (step 218). In various embodiments, the display image of step 208 is displayed, along with the notification(s) of step 216 appearing in the fixed region thereof of step 210, on one or more displays 106 (e.g. display screens) of FIG. 1 based on instructions provided by the processor 142 of FIG. 1. Also in one embodiment, the display image 300 of FIG. 3 comprises one exemplary display provided in step 218.

FIGS. 3-6 depict various exemplary display images, including accompanying notifications provided within a fixed region of the display images, in accordance with certain exemplary embodiments. In various embodiments, each of the display images of FIGS. 3-6 are provided via one or more displays 106 (e.g. display screens) within the vehicle 100 of FIG. 1 in accordance with instructions provided by the processor 142 of FIG. 1.

Figure 3:
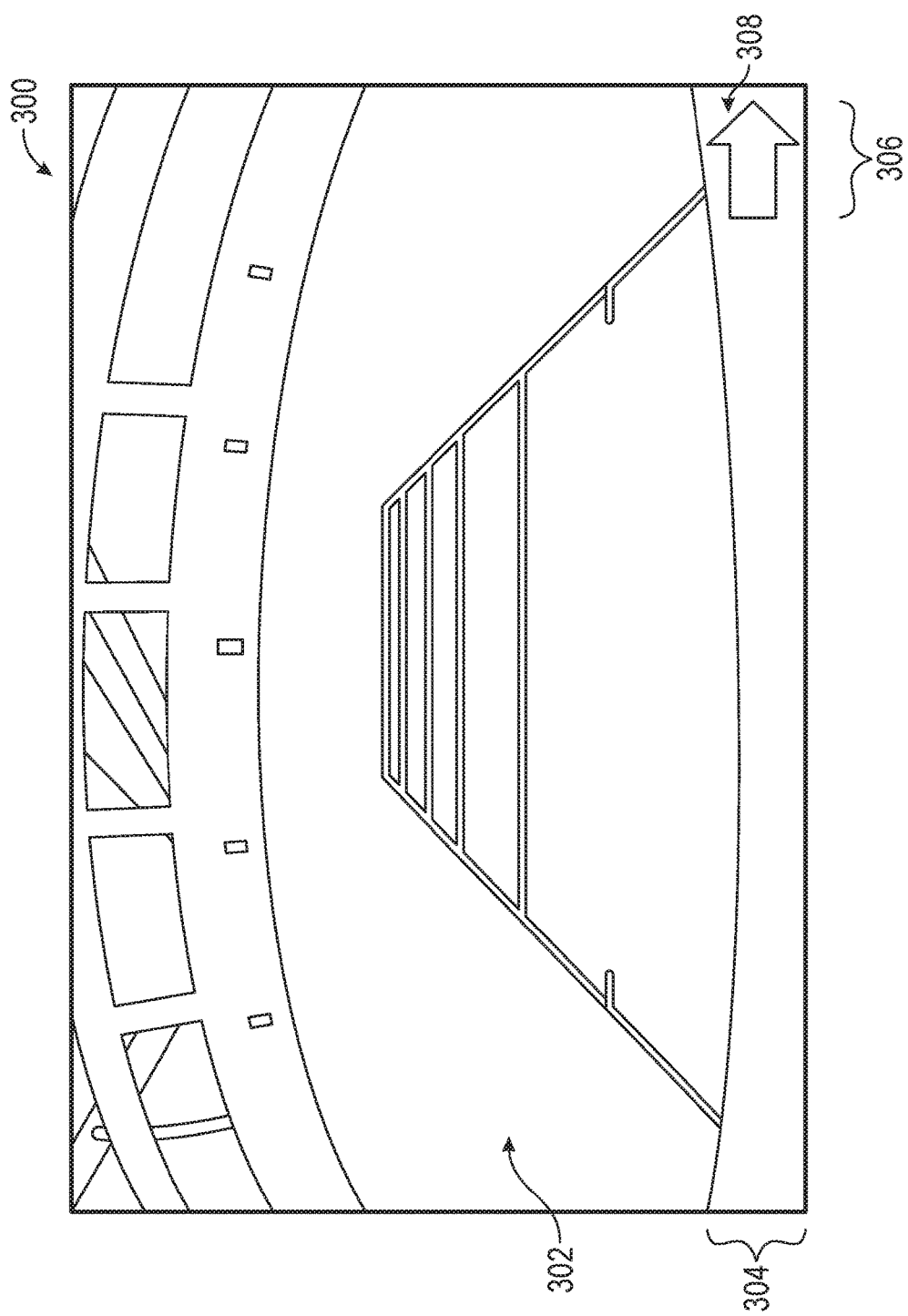
FIGS. 3-6 provide a display images for a vehicle that include notifications in a fixed region of a camera image display, and that can be implemented in connection with the vehicle, camera, and control system of FIG. 1 and the process of FIG. 2, in accordance with an exemplary embodiment.

First, FIG. 3 depicts a first exemplary display image 300. The display image 300 includes a non-fixed region 302 that provides a view of processed camera images from behind the vehicle 100. The display image 300 also includes a fixed region 304 corresponding to the rear bumper of the vehicle 100. In the display image 300 of FIG. 3, a notification 306 is provided in the fixed region 304. The notification 306 of FIG. 3 comprises an arrow 308 (e.g., a red arrow) indicating that detected objects (e.g. other vehicles, or other moving objects) are moving from left to right toward the vehicle 100 (conversely, if the detected objects were moving in an opposite direction, then the arrow 308 would face the opposite direction, in one embodiment). In one embodiment, the arrow 308 may be fixed. In another embodiment, the arrow 308 may be flashing.

Figure 4:
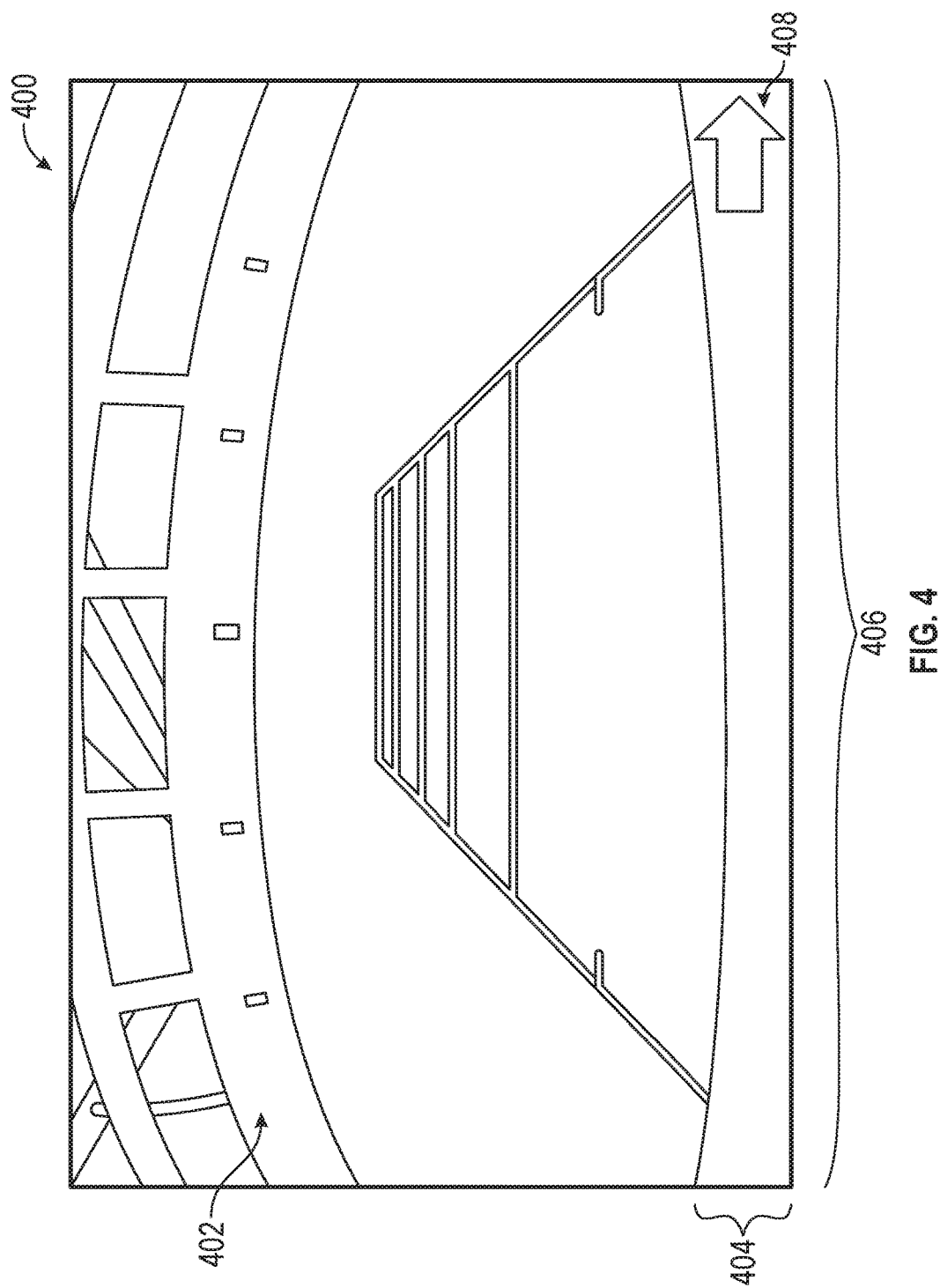

FIG. 4 depicts a second exemplary display image 400. The display image 400 includes a non-fixed region 402 that provides a view of processed camera images from behind the vehicle 100. The display image 400 also includes a fixed region 404 corresponding to the rear bumper of the vehicle 100. In the display image 400 of FIG. 4, a notification 406 is provided in the fixed region 404. The notification 406 of FIG. 4 comprises a coloring of the entire fixed region 404 with a particular color. In one example, the notification 406 includes coloring the fixed region 404 green when detected objects are not within a predetermined distance or time from the vehicle 100. Alternatively, if the detected objects are within one or more predetermined distances or time of the vehicle 100, then a different color may be utilized for the fixed region 404 (e.g., yellow, if the objects are within a first predetermined threshold, or red if the objects are within a second, closer predetermined threshold). Also in the depicted embodiment of FIG. 4, the notification 406 also includes an arrow 408 (e.g., a red arrow) indicating that detected objects (e.g. other vehicles, or other moving objects) are moving from left to right toward the vehicle 100 (conversely, if the detected objects were moving in an opposite direction, then the arrow 408 would face the opposite direction, in one embodiment). In one embodiment, the arrow 408 may be fixed. In another embodiment, the arrow 408 may be flashing.

Figure 5:
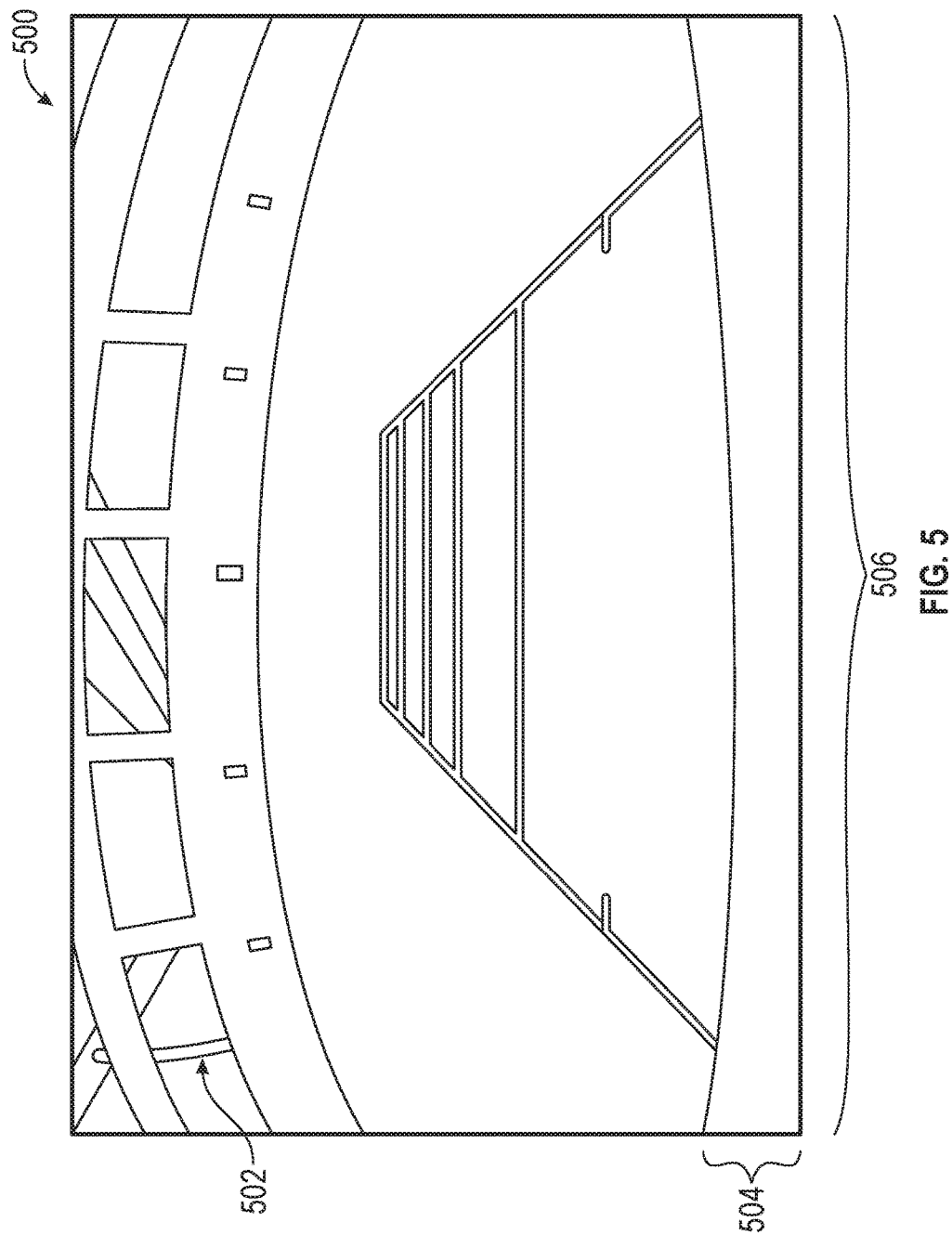

FIG. 5 depicts a third exemplary display image 500. The display image 500 includes a non-fixed region 502 that provides a view of processed camera images from behind the vehicle 100. The display image 500 also includes a fixed region 504 corresponding to the rear bumper of the vehicle 100. In the display image 500 of FIG. 5, a notification 506 is provided in the fixed region 504. The notification 506 of FIG. 5 comprises a coloring of the entire fixed region 504 with a particular color. In one example, the notification 506 includes coloring the fixed region 504 green when detected objects are not within a predetermined distance or time from the vehicle 100. Alternatively, if the detected objects are within one or more predetermined distances or time of the vehicle 100, then a different color may be utilized for the fixed region 504 (e.g., yellow, if the objects are within a first predetermined threshold, or red if the objects are within a second, closer predetermined threshold). Also in the depicted embodiment of FIG. 5, the coloring of the fixed region 504 comprises the entire notification 506.

Figure 6:
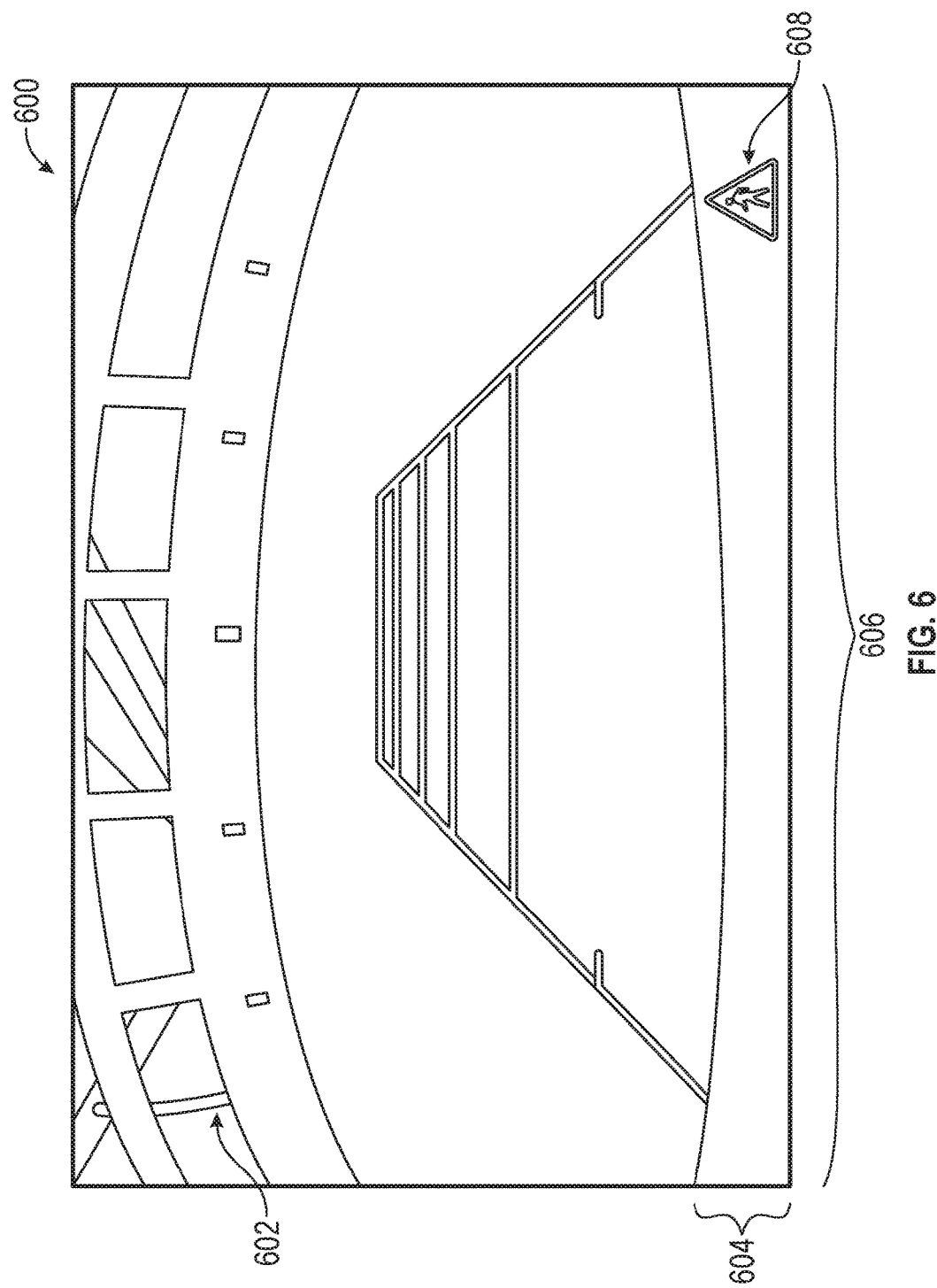

FIG. 6 depicts a fourth exemplary display image 600. The display image 600 includes a non-fixed region 602 that provides a view of processed camera images from behind the vehicle 100. The display image 600 also includes a fixed region 604 corresponding to the rear bumper of the vehicle 100. In the display image 600 of FIG. 6, a notification 606 is provided in the fixed region 604. The notification 606 of FIG. 6 comprises a coloring of the entire fixed region 604 with a particular color. In one example, the notification 406 includes coloring the fixed region 604 red when detected objects are within a first predetermined distance or time from the vehicle 100. Alternatively, if the detected objects are not within the first predetermined distance or time of the vehicle 100, but are within a second, farther, distance or time from the vehicle 100, then a different color may be utilized for the fixed region 604 (e.g., yellow). On the other hand, if the objects are not within the first or second predetermined threshold, then a third color (e.g., green) may be utilized. Also in the depicted embodiment of FIG. 6, the notification 606 also includes a pedestrian symbol 608 (e.g. depicting a yellow person inside a yellow triangle) indicating that a detected pedestrian is proximate the vehicle 100. In one embodiment, the pedestrian symbol 608 may be fixed. In another embodiment, the pedestrian symbol 608 may be flashing.

Also as depicted in FIG. 1, in one embodiment the process returns to step 204. Steps 204-218 then performed, continuously in one embodiment, in a new iteration. In one embodiment, steps 204-218 repeat, preferably continuously, so long as the current vehicle drive or ignition cycle is in operation, and/or so long as the camera 102 is currently being used, among other possible variations in different embodiments.

It will be appreciated that the systems, vehicles, and methods may vary from those depicted in the Figures and described herein. For example, the vehicle 100, the camera 102, the displays 106, the control system 108, and/or various components thereof may vary from that depicted in FIGS. 1-3 and described in connection therewith, in various embodiments. It will similarly be appreciated that the steps of the process 200 may differ from those depicted in FIGS. 2-6, and/or that various steps of the process 200 may occur concurrently and/or in a different order than that depicted in FIGS. 2-6, in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A method comprising:
   obtaining camera images for a camera that is mounted on a vehicle, each of the camera images including a plurality of frames, and each frame including a plurality of pixels;

generating, via a processor, a display image based on a processing of the camera images for display on a display screen within the vehicle;

analyzing corresponding pixels for each of the plurality of frames, in sequence, with respect a respective color and a respective brightness for each of the pixels for each of the frames, via the processor;

determining, via the processor, a fixed region of the display image corresponding to a fixed part of the vehicle, based on the analyzing of the corresponding pixels for each of the plurality of frames, wherein the fixed region is determined by the processor as being a region of the display image in which a rate of change in pixel color, pixel brightness, or both for pixels within the region across multiple frames in sequence is less than a predetermined threshold; and providing notifications on the display image in the fixed region of the display image.

2. The method of claim 1, wherein:
the camera images show a region behind the vehicle;
the method further comprises detecting, via one or more sensors, the presence of one or more objects in proximity to the vehicle; and
the step of providing the notifications comprises providing, in the fixed region of the display image, notifications pertaining to the detected objects.

3. The method of claim 2, wherein:
the step of providing the notifications comprises providing, in the fixed region of the display image, notifications in a particular color based at least in part on a position of the object with respect to the vehicle.

4. The method of claim 2, wherein:
the method further comprises determining, using information provided by the one or more sensors, a direction of movement of the one or more objects in proximity to the vehicle; and
the step of providing the notifications comprises providing, in the fixed region of the display image, a notification corresponding to the determined direction of movement.

5. A system comprising:
a communication link configured to provide camera images for a camera that is mounted on a vehicle, each of the camera images including a plurality of frames, and each frame including a plurality of pixels; and
a processor configured to at least facilitate:
generating a display image based on a processing of the camera images, for display on a display screen within the vehicle;
analyzing corresponding pixels for each of the plurality of frames, in sequence, with respect a respective color and a respective brightness for each of the pixels for each of the frames;
determining a fixed region of the display image corresponding to a fixed part of the vehicle, based on the analyzing of the corresponding pixels for each of the plurality of frames, wherein the fixed region is determined as being a region of the display image in which a rate of change in pixel color, pixel brightness, or both for pixels within the region across multiple frames in sequence is less than a predetermined threshold; and
providing notifications on the display image in the fixed region of the display image.

6. The system of claim 5, wherein:
the camera images show a region behind the vehicle;
the system further comprises one or more sensors configured to detect the presence of one or more objects in proximity to the vehicle; and
the processor is configured to at least facilitate providing, in the fixed region of the display image, notifications pertaining to the detected objects.

7. The system of claim 6, wherein the processor is configured to at least facilitate providing, in the fixed region of the display image, notifications in a particular color based at least in part on a position of the object with respect to the vehicle.

8. The system of claim 6, wherein the processor is configured to at least facilitate providing, in the fixed region of the display image, a notification corresponding to the determined direction of movement.

9. A vehicle comprising:
a body;
a camera mounted on the body, the camera configured to generate camera images, each of the camera images including a plurality of frames, and each frame including a plurality of pixels; and
a processor configured to at least facilitate:
generating a display image based on a processing of the camera images, for display on a display screen within the vehicle;
analyzing corresponding pixels for each of the plurality of frames, in sequence, with respect a respective color and a respective brightness for each of the pixels for each of the frames;
determining a fixed region of the display image corresponding to a fixed part of the vehicle, based on the analyzing of the corresponding pixels for each of the plurality of frames, wherein the fixed region is determined by the processor as being a region of the display image in which a rate of change in pixel color, pixel brightness, or both for pixels within the region across multiple frames in sequence is less than a predetermined threshold; and
providing notifications on the display image in the fixed region of the display image.

10. The vehicle of claim 9, wherein:
the camera images show a region behind the vehicle;
the system further comprises one or more sensors configured to detect the presence of one or more objects in proximity to the vehicle; and
the processor is configured to at least facilitate providing, in the fixed region of the display image, notifications pertaining to the detected objects.

11. The vehicle of claim 10, wherein the processor is configured to at least facilitate providing, in the fixed region of the display image, notifications in a particular color based at least in part on a position of the object with respect to the vehicle.

12. The vehicle of claim 10, wherein the processor is configured to at least facilitate providing, in the fixed region of the display image, a notification corresponding to the determined direction of movement.

13. The vehicle of claim 9, further comprising:
a communication link configured to provide the camera images from the camera to the processor; and
a display screen configured to provide the display image, including the notifications on the fixed region thereof, based on instructions provided by the processor.

14. The method of claim 1, wherein the fixed region is determined by the processor as being a region of the display image in which a rate of change in pixel color for pixels within the region across multiple frames in sequence is less than the predetermined threshold.

15. The method of claim 1, wherein the fixed region is determined by the processor as being a region of the display image in which a rate of change in pixel brightness for pixels within the region across multiple frames in sequence is less than the predetermined threshold.

16. The system of claim 5, wherein the processor is configured to determine the fixed processor as being a region of the display image in which a rate of change in pixel color for pixels within the region across multiple frames in sequence is less than the predetermined threshold.

17. The system of claim 5, wherein the processor is configured to determine the fixed processor as being a region of the display image in which a rate of change in pixel brightness for pixels within the region across multiple frames in sequence is less than the predetermined threshold.

18. The vehicle of claim 9, wherein the processor is configured to determine the fixed processor as being a region of the display image in which a rate of change in pixel color for pixels within the region across multiple frames in sequence is less than the predetermined threshold.

19. The vehicle of claim 9, wherein the processor is configured to determine the fixed processor as being a region of the display image in which a rate of change in pixel brightness for pixels within the region across multiple frames in sequence is less than the predetermined threshold.

20. The vehicle of claim 9, wherein the processor is configured to determine the fixed processor as being a region of the display image in which both:
    a rate of change in pixel color for pixels within the region across multiple frames in sequence is less than a first predetermined threshold; and
    a rate of change in pixel brightness for pixels within the region across multiple frames in sequence is less than a second predetermined threshold.

* * * * *